(12) United States Patent
Wu

(10) Patent No.: US 6,762,975 B2
(45) Date of Patent: Jul. 13, 2004

(54) PROGRAMMABLE COFFEE MAKER CAPABLE OF AUTOMATICALLY CANCELING A PRESET BREWING TIME

(75) Inventor: Tsan-Kuen Wu, Tainan Hsien (TW)

(73) Assignee: Eupa International Corporation, Las Vegas, NV (US)

( * ) Notice: Subject to any disclaimer, the term of this patent is extended or adjusted under 35 U.S.C. 154(b) by 264 days.

(21) Appl. No.: 10/139,436

(22) Filed: May 6, 2002

(65) Prior Publication Data

US 2003/0206492 A1 Nov. 6, 2003

(51) Int. Cl.[7] .............................................. G04B 47/00
(52) U.S. Cl. ......................... 368/10; 99/281; 219/481; 219/482
(58) Field of Search ..................... 368/10; 99/280–283, 99/285, 288, 289 P, 298; 219/481–483, 489, 490, 494, 497, 507, 509

(56) References Cited

U.S. PATENT DOCUMENTS 5,193,139 A * 3/1993 Schiettecatte ............... 392/480
5,455,887 A * 10/1995 Dam ........................... 392/467
5,684,759 A * 11/1997 Huang et al. .................. 368/10
6,000,317 A * 12/1999 Van Der Meer .............. 99/282
6,380,521 B1 * 4/2002 Fanzutti ....................... 219/481

* cited by examiner

Primary Examiner—David Martin
Assistant Examiner—Thanh S. Phan
(74) Attorney, Agent, or Firm—Trop, Pruner & Hu, P.C.

(57) ABSTRACT

A control circuit of a programmable coffee maker includes an input unit for inputting a preset brewing time, a heater controller for controlling electrical connection between an electric heating device and a power supply, a sensor unit for providing a cancel signal when temperature at a supply pipe connected to a water reservoir and heated by the heating device reaches a predetermined critical temperature, and a processor having an internal clock with a current time output. The processor controls the heater controller to make electrical connection between the heating device and the power supply when the preset brewing time coincides with the current time output, and cancels the preset brewing time and controls the heater controller to break the electrical connection between the heating device and the power supply after the processor receives the cancel signal from the sensor unit.

3 Claims, 4 Drawing Sheets

PROGRAMMABLE COFFEE MAKER CAPABLE OF AUTOMATICALLY CANCELING A PRESET BREWING TIME

BACKGROUND OF THE INVENTION

1. Field of the Invention

The invention relates to a coffee maker, more particularly to a programmable coffee maker that is capable of automatically canceling a preset brewing time.

2. Description of the Related Art

In a conventional coffee maker, an electric heating device is mounted in a base, and is controlled by a control circuit to heat a supply pipe. Water in a water reservoir is heated as it passes through the supply pipe, and drips into a filter basket that contains ground coffee. Brewed coffee from the filter basket is collected in a flask on the base. The control circuit of some conventional coffee makers can be programmed for brewing coffee automatically at a preset time of day. However, the conventional coffee makers are unsafe since, unless the preset brewing time was cancelled, the conventional coffee makers will be activated automatically even when the water reservoir is empty.

SUMMARY OF THE INVENTION

Therefore, the object of the present invention is to provide a programmable coffee maker that is capable of automatically canceling a preset brewing time to overcome the aforesaid drawback of the prior art.

According to this invention, a programmable coffee maker comprises a water reservoir for receiving water therein, a base disposed at a lower end of the water reservoir, a filter basket, and a control circuit mounted on the base. The base includes a housing, an electric heating device mounted in the housing, and a supply pipe in fluid communication with the water reservoir and heated by the electric heating device when electric power is supplied to the electric heating device. The filter basket is disposed above the base and is disposed to receive heated water from the supply pipe. The control circuit includes an input unit operable so as to input a preset brewing time, a heater controller connected to the electric heating device and operable so as to control electrical connection between the electric heating device and a power supply, a sensor unit for providing a cancel signal when temperature at the supply pipe reaches a predetermined critical temperature indicative of a condition where the supply pipe is heated with the water reservoir being in an emptied state, and a processor connected to the input unit, the heater controller, and the sensor unit. The processor has an internal clock with a current time output, and controls the heater controller to make electrical connection between the electric heating device and the power supply when the preset brewing time coincides with the current time output. The processor cancels the preset brewing time, and controls the heater controller to break the electrical connection between the electric heating device and the power supply after the processor receives the cancel signal from the sensor unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
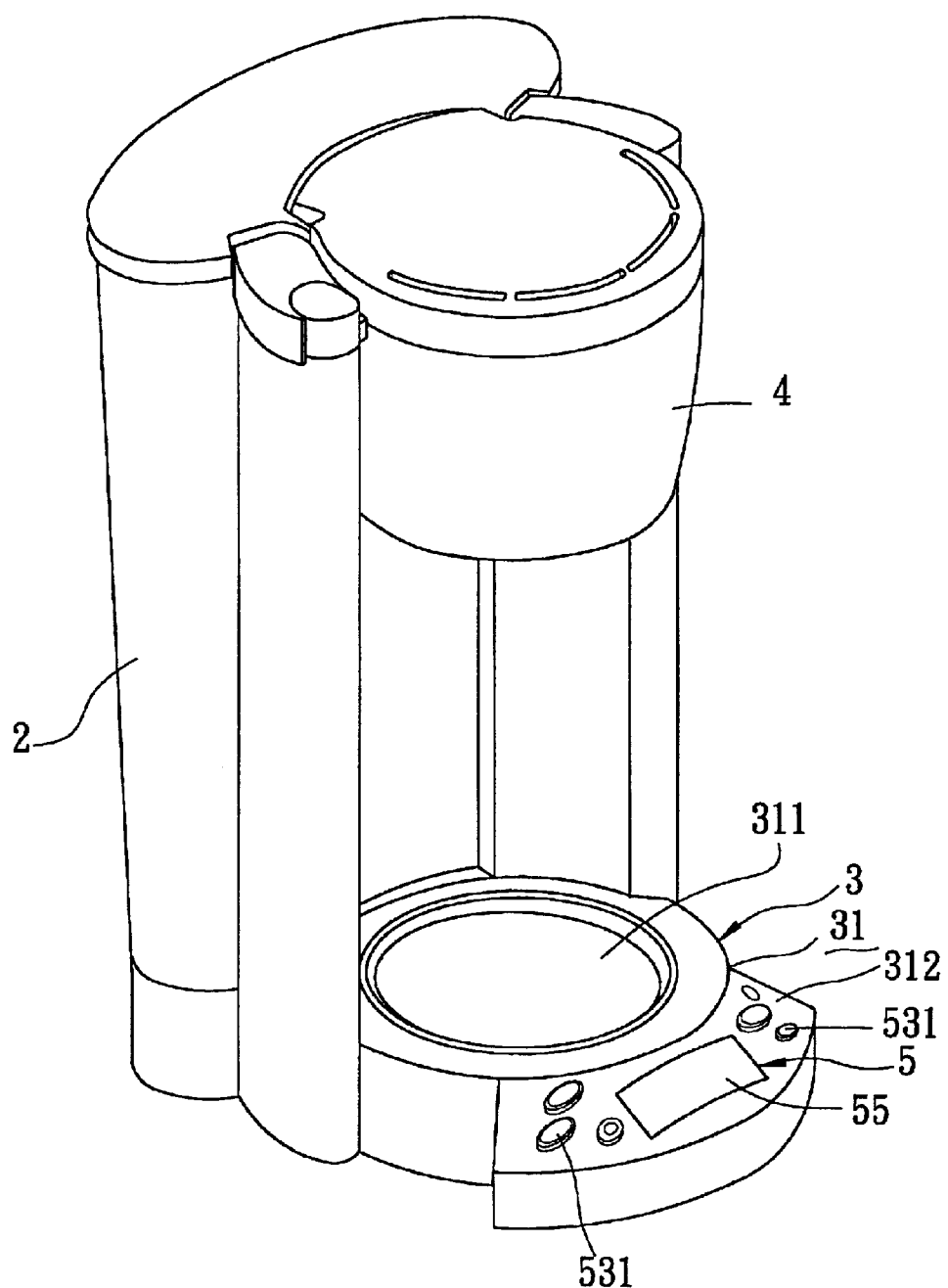
FIG. 1 is a perspective view of the preferred embodiment of a coffee maker according to this invention.

Referring to FIG. 1, the preferred embodiment of a programmable coffee maker according to this invention is shown to comprise a water reservoir 2 for receiving water therein, a base 3 disposed at a lower end of the water reservoir 2, a filter basket 4 disposed above the base 3 and to be supplied with water from the water reservoir 2, and a control circuit 5 mounted on the base 3.

Since the construction of the water reservoir 2 and the filter basket 4 are known to those skilled in the art, a detailed description of the same will be dispensed with herein for the sake of brevity.

Figure 2:
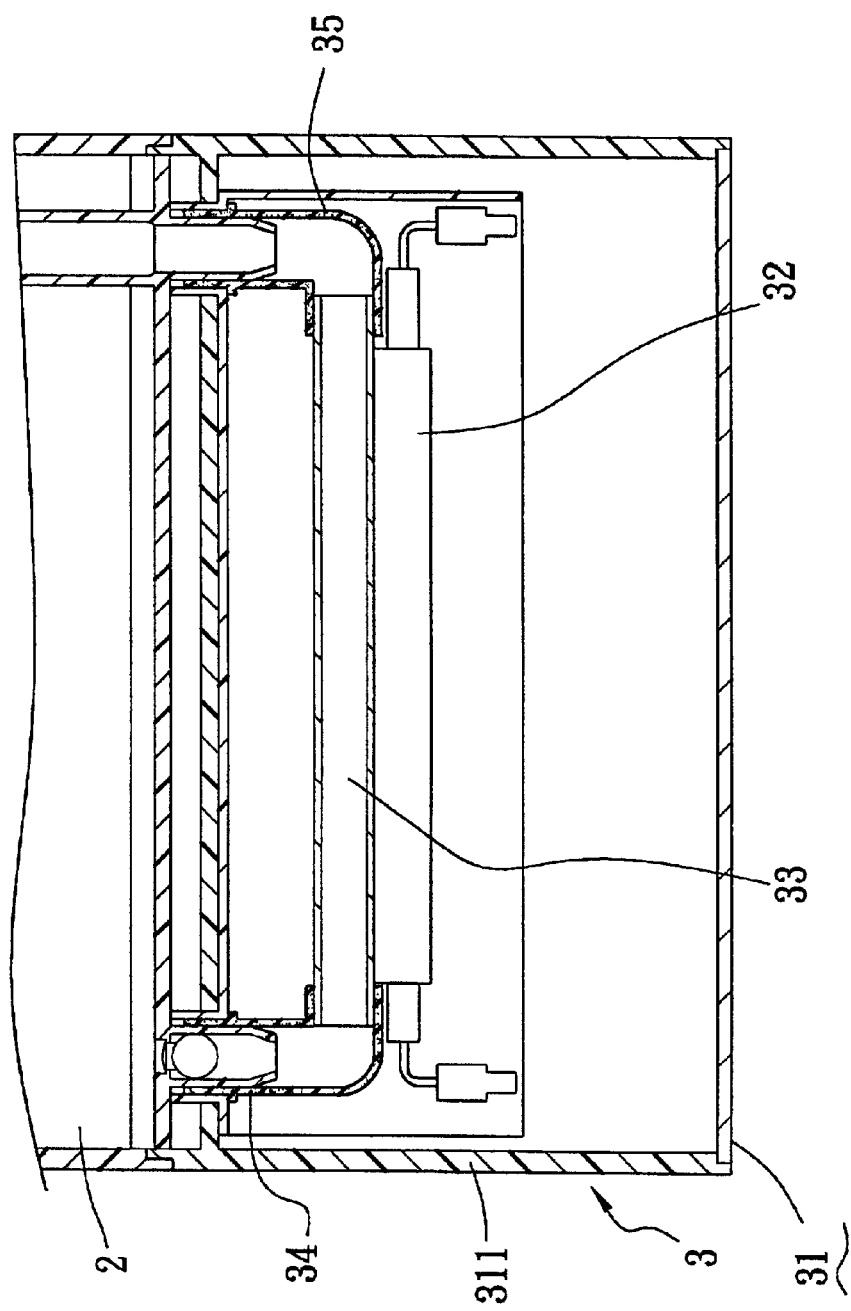
FIG. 2 is a fragmentary partly sectional view of the preferred embodiment.

With further reference to FIG. 2, the base 3 includes a housing 31, an electric heating device 32 mounted in a rear portion 311 of the housing 31, and a supply pipe 33 in fluid communication with the water reservoir 2 and heated by the electric heating device 32. The supply pipe 33 is disposed horizontally in the rear portion 311 of the housing 31, and has an inlet tube 34 and an outlet tube 35 coupled to two ends thereof. The inlet tube 34 is used to draw water in the water reservoir 2 into the supply pipe 33. The electric heating device 32 is in contact with the supply pipe 33 such that, when electric power is supplied to the electric heating device 32, the electric heating device 32 radiates heat for rapidly heating the water flowing through the supply pipe 33. The outlet tube 35 is used to supply the heated water in the supply pipe 33 to the filter basket 4 in a conventional manner. Under normal brewing conditions, water in the water reservoir 2 is continuously supplied to the filter basket 4 via the supply pipe 33 in the aforesaid manner until the water reservoir 2 has been emptied.

Figure 3:
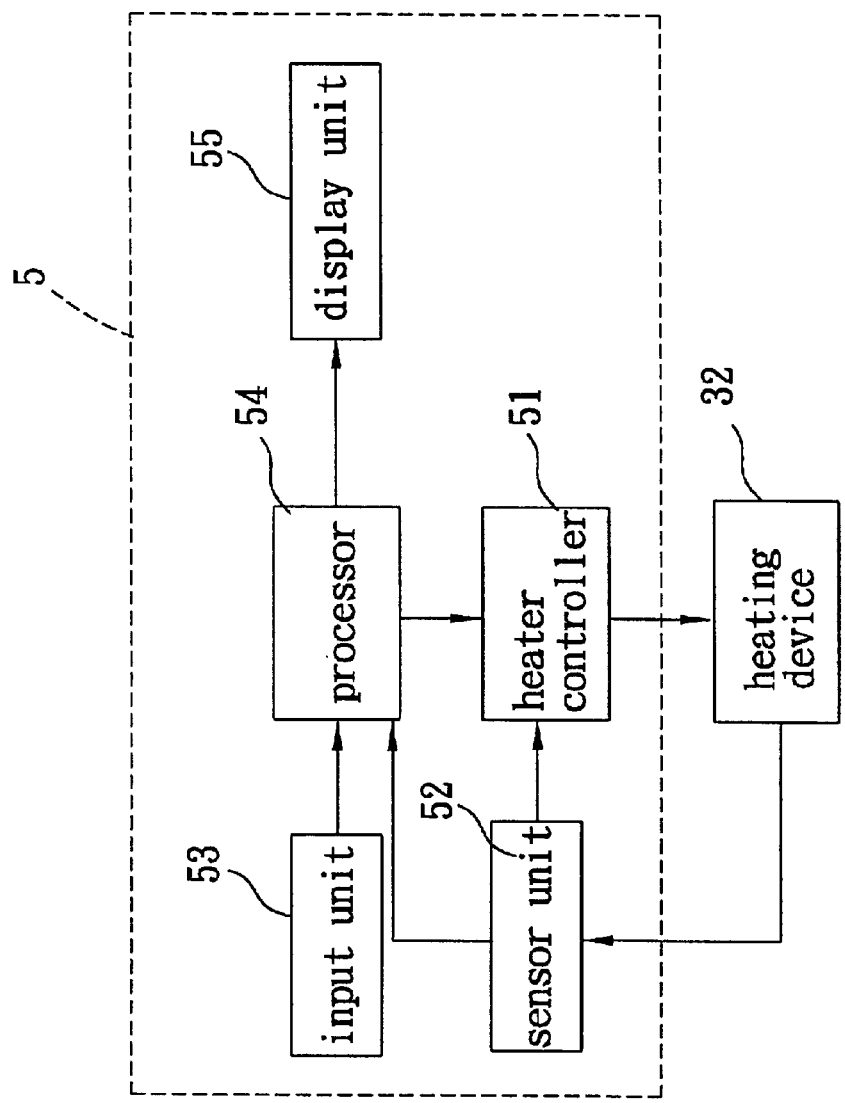
FIG. 3 is a schematic circuit block diagram of the preferred embodiment.
Figure 4:
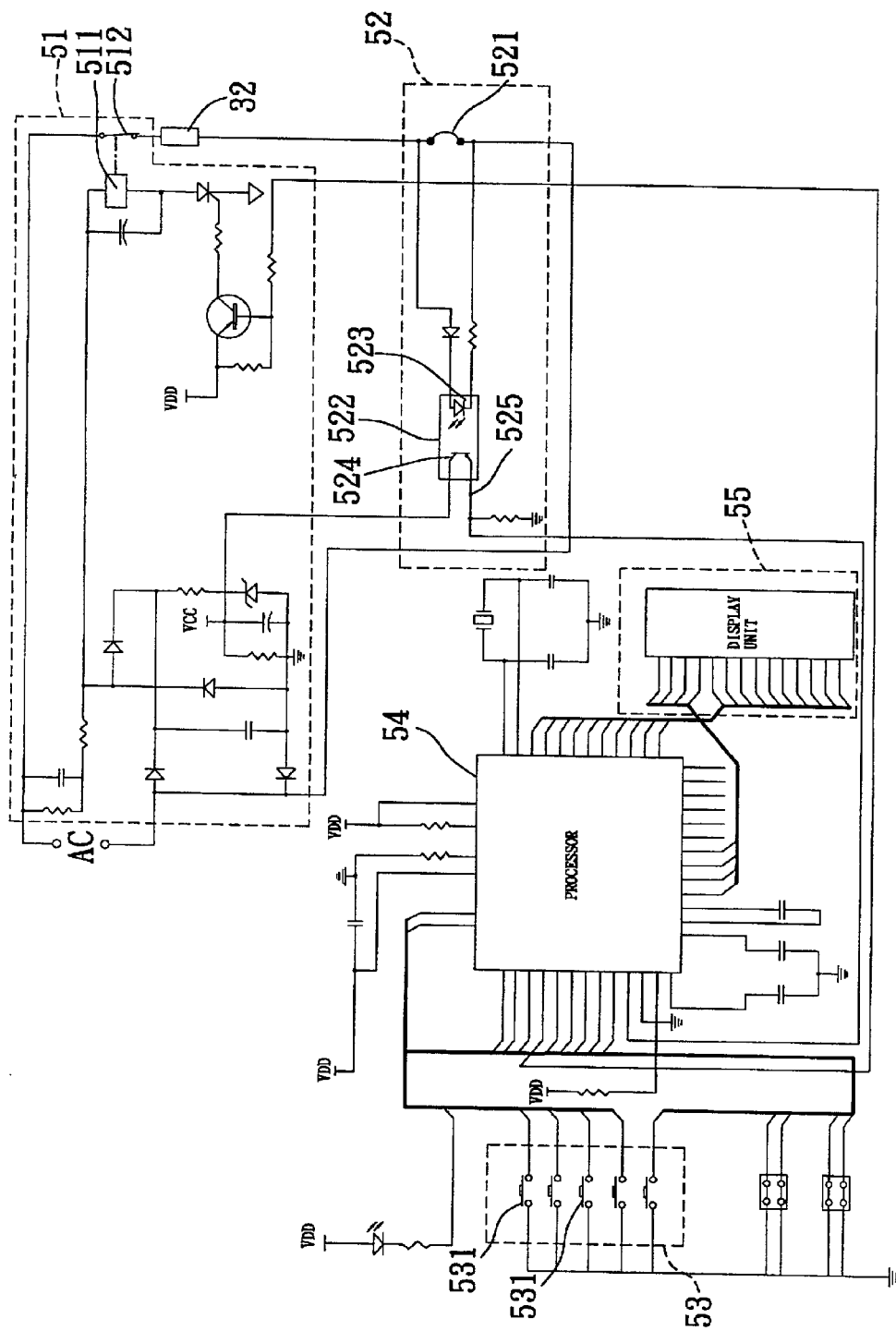
FIG. 4 is a schematic electric circuit diagram of the preferred embodiment.

Referring further to FIGS. 3 and 4, the control circuit 5 includes an input unit 53, a heater controller 51 connected to the electric heating device 32 and operable so as to control electrical connection between the electric heating device 32 and an AC power supply, a sensor unit 52 for providing a cancel signal when temperature at the supply pipe 33 reaches a predetermined critical temperature higher than 100° C., such as 120° C., a processor 54 connected to the input unit 53, the heater controller 51, and the sensor unit 52, and a display unit 55 connected to and controlled by the processor 54.

The input unit 53 includes a plurality of push-button switches 531 mounted on a front portion 312 of the housing 31 of the base 3, as best shown in FIG. 1. The input unit 53 is operable so as to input brewing control settings, such as power activation, brewing time setting, brewing mode selection, and temperature and clock adjustment, etc., for reception by the processor 54. Thus, by operating the input unit 53, the processor 54 can be programmed to control the heater controller 51 to make electrical connection between the electric heating device 32 and the AC power supply for brewing coffee automatically at a preset brewing time. Since the feature of the present invention does not reside in how the push-button switches 531 are operated for brewing control, a detailed description of the same will be dispensed with herein for the sake of brevity.

In this embodiment, the sensor unit 52 includes a thermostat 521 and an optoelectronic coupled circuit 522. The thermostat 521 has a circuit breaking temperature equal to the predetermined critical temperature, is connected in series to the electric heating device 32 and the heater controller 51, and senses the temperature at the supply pipe 33. When the temperature at the supply pipe 33 reaches the predetermined critical temperature, the thermostat 521 switches from a closed-circuit state to an open-circuit state. The optoelectronic coupled circuit 522 includes a light transmitter 523 and a light receiver 524. In this embodiment, the light transmitter 523 is a light emitting diode, whereas the light receiver 524 is a phototransistor. The light transmitter 523 is connected across the thermostat 521. Thus, electrical current does not flow through the light transmitter 523 when the thermostat 521 is in the closed-circuit state. However, when the thermostat 521 switches to the open-circuit state, electric current is permitted to flow through the light transmitter 523 to enable the latter to emit light. The light emitted by the light transmitter 523 enables the light receiver 524 to conduct, thereby resulting in the cancel signal that is provided to the processor 54 via an output terminal 525 of the light receiver 524. In this embodiment, the cancel signal is a high logic signal.

The processor 54 controls brewing operation of the coffee maker according to the brewing control settings, which were inputted via the input unit 53. In case a brewing time was preset, the processor 54 controls the heater controller 51 to make electrical connection between the electric heating device 32 and the AC power supply when the preset brewing time coincides with a current time output of an internal clock of the processor 54 so that coffee can be brewed automatically. When the water reservoir 2 contains water therein, the water flowing through the supply pipe 33 can prevent the latter from being heated by the electric heating device 32 to the predetermined critical temperature. However, when the water reservoir 2 is in an emptied state, continued heating operation of the electric heating device 32 will result in a rapid increase in the temperature of the supply pipe 33. When the temperature at the supply pipe 33 reaches the predetermined critical temperature, the cancel signal will be provided to the processor 54 via the output terminal 525 of the light receiver 524. At this time, aside from activating a relay 511 of the heater controller 51 to enable a relay contact 512 of the latter to break the electrical connection between the electric heating device 32 and the AC power supply, the processor 54 further cancels the preset brewing time automatically. Therefore, subsequent automatic activation of the programmable coffee maker of this invention can be avoided when the water reservoir 2 has yet to be replenished with water.

It should be noted that canceling of the preset brewing time and activating of the relay 511 for breaking the electrical connection between the electric heating device 32 and the AC power supply need not necessarily be performed by the processor 54 immediately upon receipt of the cancel signal from the sensor unit 52. In the preferred embodiment, the processor 54 cancels the preset brewing time and activates the relay 511 a predetermined time delay, such as 2 seconds, after the processor 54 continuously receives the cancel signal from the light receiver 524 to minimize the possibility of erroneous operation.

In this embodiment, the display unit 55 is in the form of a liquid crystal display, and is controlled by the processor 54 to show different information, such as operating mode, temperature, time, etc., thereon.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A programmable coffee maker comprising:

a water reservoir for receiving water therein;

a base disposed at a lower end of said water reservoir and including a housing, an electric heating device mounted in said housing, and a supply pipe in fluid communication with said water reservoir and heated by said electric heating device when electric power is supplied to said electric heating device;

a filter basket disposed above said base and disposed to receive heated water from said supply pipe; and a control circuit mounted on said base, said control circuit including an input unit operable so as to input a preset brewing time, a heater controller connected to said electric heating device and operable so as to control electrical connection between said electric heating device and a power supply, a sensor unit for providing a cancel signal when temperature at said supply pipe reaches a predetermined critical temperature indicative of a condition where said supply pipe is heated with said water reservoir being in an emptied state, and a processor connected to said input unit, said heater controller, and said sensor unit, said processor having an internal clock with a current time output, and controlling said heater controller to make electrical connection between said electric heating device and the power supply when the preset brewing time coincides with the current time output, said processor canceling the preset brewing time and controlling said heater controller to break the electrical connection between said electric heating device and the power supply after said processor receives the cancel signal from said sensor unit.

2. The programmable coffee maker as claimed in claim 1, wherein said sensor unit includes:

a thermostat connected in series to said electric heating device and said heater controller, said thermostat having a circuit breaking temperature equal to the predetermined critical temperature; and an optoelectronic coupled circuit including a light transmitter connected across said thermostat, and a light receiver connected to said processor, said thermostat switching from a closed-circuit state to an open-circuit state to permit electric current flow through said light transmitter when the temperature at said supply pipe reaches the predetermined critical temperature, said light transmitter emitting light when electric current flows therethrough, said light receiver being enabled to provide the cancel signal to said processor upon receipt of the light emitted by said light transmitter.

3. The programmable coffee maker as claimed in claim 1, wherein said processor cancels the preset brewing time and controls said heater controller to break the electrical connection between said electric heating device and the power supply a predetermined time delay after said processor continuously receives the cancel signal from said sensor unit.

* * * * *